United States Patent
Bessieres et al.

(10) Patent No.: US 10,789,323 B2
(45) Date of Patent: Sep. 29, 2020

(54) SYSTEM AND METHOD FOR ACTIVE BROWSING

(75) Inventors: Marshall Bessieres, Palo Alto, CA (US); David Brinegar, Novato, CA (US); Mark O'Brien, San Francisco, CA (US); Brian Sullivan, San Francisco, CA (US); Steven Kusmer, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 1368 days.

(21) Appl. No.: 11/866,248

(22) Filed: Oct. 2, 2007

(65) Prior Publication Data

US 2008/0082509 A1 Apr. 3, 2008

Related U.S. Application Data

(60) Provisional application No. 60/827,843, filed on Oct. 2, 2006.

(51) Int. Cl.
*G06F 16/957* (2019.01)

(52) U.S. Cl.
CPC .................................. *G06F 16/957* (2019.01)

(58) Field of Classification Search
None
See application file for complete search history.

(56) References Cited

U.S. PATENT DOCUMENTS

| | | | |
|---|---|---|---|
| 6,182,133 B1 * | 1/2001 | Horvitz ........................ 709/223 |
| 6,275,829 B1 * | 8/2001 | Angiulo et al. | |
| 6,539,382 B1 * | 3/2003 | Byrne ................. G06F 12/0862 707/694 |
| 7,281,008 B1 * | 10/2007 | Lawrence ......... G06F 17/30864 |
| 2001/0044758 A1 * | 11/2001 | Talib ................ G06F 17/30622 705/26.1 |
| 2002/0103698 A1 * | 8/2002 | Cantrell ......................... 705/14 |
| 2003/0014415 A1 * | 1/2003 | Weiss et al. .................... 707/10 |
| 2003/0061195 A1 * | 3/2003 | Laborde et al. ................. 707/1 |
| 2004/0064471 A1 * | 4/2004 | Brown et al. ................. 707/100 |
| 2004/0260577 A1 | 12/2004 | Dahlin |
| 2005/0033764 A1 * | 2/2005 | Reid ......................... G06F 8/34 |
| 2005/0114305 A1 * | 5/2005 | Haynes ................. G06F 3/0481 |
| 2005/0267871 A1 * | 12/2005 | Marchisio et al. ............... 707/3 |
| 2005/0278328 A1 * | 12/2005 | Marston et al. .................. 707/7 |
| 2006/0004716 A1 * | 1/2006 | Hurst-Hiller ..... G06F 17/30867 |
| 2006/0053097 A1 * | 3/2006 | King et al. ........................ 707/3 |

(Continued)

OTHER PUBLICATIONS

Stephen Davies; "Google* by Reformulation": Modeling Search as Successive Refinement; IEEE; 2004; pp. 1-6 (Year: 2004).*

*Primary Examiner* — Mariela Reyes
*Assistant Examiner* — Jermaine A Mincey
(74) *Attorney, Agent, or Firm* — Kilpatrick Townsend & Stockton LLP

(57) ABSTRACT

Systems and methods are provided that employ a client side browser application and server side website applications that use optimization, prefetching, and caching of user interactions. These are used in combination with mouseover callouts to provide browsable search result refinements and additional product information. The systems and methods can be applied to site search applications and site-wide navigation and can be integrated with web analytics solutions to optimize the user interface and information provided based on real time end user browsing trends.

26 Claims, 4 Drawing Sheets

(56) References Cited

U.S. PATENT DOCUMENTS

| | | |
|---|---|---|
| 2006/0059204 A1* | 3/2006 | Borthakur et al. ............ 707/200 |
| 2006/0074883 A1* | 4/2006 | Teevan et al. .................... 707/3 |
| 2006/0101514 A1* | 5/2006 | Milener et al. ................. 726/22 |
| 2006/0136383 A1* | 6/2006 | Golla ................................ 707/3 |
| 2007/0073776 A1* | 3/2007 | Kalalian et al. ........... 707/104.1 |
| 2007/0244856 A1* | 10/2007 | Plastina ............ G06F 17/30053 |
| 2008/0104127 A1* | 5/2008 | Billmaier .......... G06F 17/30029 |

* cited by examiner

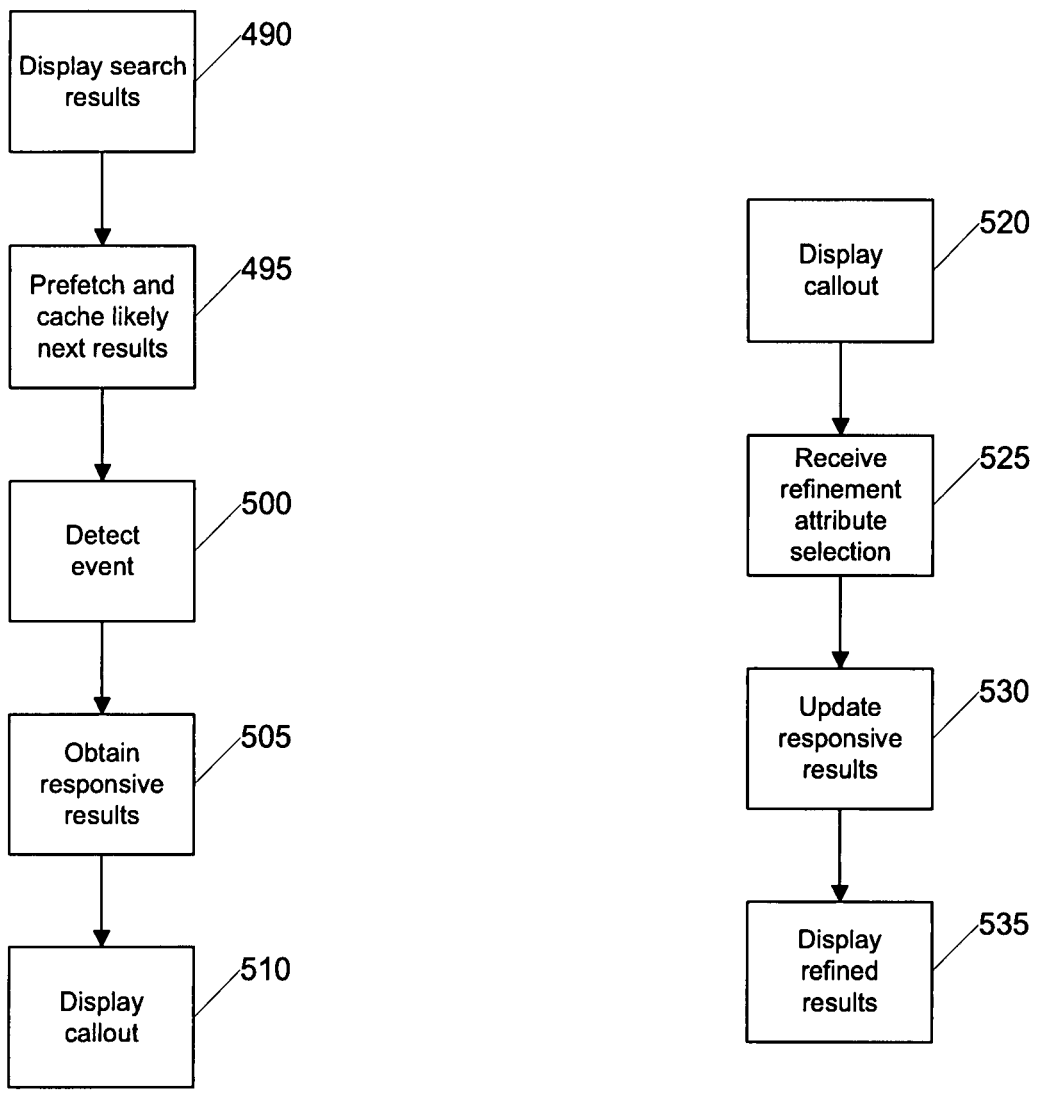

SYSTEM AND METHOD FOR ACTIVE BROWSING

RELATED APPLICATION

The present application claims priority to U.S. provisional patent application Ser. No. 60/827,843 filed on Oct. 2, 2006, which is incorporated herein by reference in its entirety.

FIELD OF THE INVENTION

The present invention generally relates to the field of web browsing and more particularly relates to website search techniques that provide end users with simple and fast access to information provided by a website.

BACKGROUND

Conventional websites employ site search solutions in an attempt to provide end users with a pleasant experience that results in consumption of the goods or services offered by the website. Such consumption is typically referred to as a conversion. FIG. 1 is a web browser user interface that illustrates an example conventional result set for a website search where the end user searched for "men's t-shirts" on a website offering apparel products.

One significant drawback of conventional websites is that they require an end user to review information on the search results page and make a decision to view more detail about a particular product or use a refinement option to limit the search results to a smaller set of products. For example, a visitor could click on the blue shirt named "5 Star Pocket T-Shirt" to find out that it is available in more colors. Alternatively, a visitor could click on "Big and Tall" under the "Collection" refinements to limit the search results for "men's shirts" to those that meet the further "Big and Tall" limitation.

One particular disadvantage of these conventional search results is that the decision to narrow the search results or obtain more information about a particular product is both cumbersome and time consuming, because once the decision is acted upon the end user must wait for the new page to load and then view a completely new page. Then, after the end user can view the new page, if that new page does not provide the expected results or desired information, the end user must click on the browser's "Back" button to navigate back to the previous search result to continue efforts to refine the search or obtain additional product information. This cumbersome back and forth interaction with the visitor results in a poor experience for the end user and reduces conversions.

Accordingly, because the decision to seek additional information or refine the search results requires additional clicks by the end user and is also time consuming, visitors often will not do so, which means that the end user is less likely to find a desired product or service or information. As a result, the overall site conversion rate is limited by the amount of effort the visitor is willing to expend searching. Therefore, what is needed is a system and method that overcomes these problems found in the solutions being offered today.

SUMMARY

Described herein are systems and methods that provide website visitors with additional search data about desired products and services and refinements to narrow search results without requiring that the visitor make additional cumbersome and time consuming browsing decisions that diminish the end user experience and reduce conversions.

The improved systems and methods employ optimization, prefetching, and caching of user interactions between a client side browser application and a server side website search application. Additionally, mouseover callouts are used to provide browsable search result refinements and additional product information. The improved systems and methods can be applied to site search applications and site-wide navigation and can be integrated with web analytics solutions to optimize the user interface and information provided based on real time end user browsing trends.

While these approaches are shown for site search applications, the same approaches can be used for site-wide navigation. Lastly, integration with web analytics data can be used to optimize the user interface elements shown based on real time historical end user browsing trends. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 is a flow diagram illustrating an example method for providing a callout with preview data according to an embodiment of the present invention;

FIG. 6 is a flow diagram illustrating another example method for providing a callout with preview data according to an embodiment of the present invention;

FIG. 7 is a flow diagram illustrating an example method for refining the preview data results displayed in a callout according to an embodiment of the present invention.

DETAILED DESCRIPTION

Certain embodiments as disclosed herein provide for systems and methods that employ a client side browser application and server side website applications that use optimization, prefetching, and caching of user interactions with mouseover callouts to present browsable search result refinements and additional product information to an end user. The systems and methods can be applied to site search applications and site-wide navigation and can be integrated with web analytics solutions to optimize the user interface and information provided based on real time end user browsing trends.

After reading this description it will become apparent to one skilled in the art how to implement the invention in various alternative embodiments and alternative applications. However, although various embodiments of the present invention are described herein, it is understood that these embodiments are presented by way of example only, and not limitation. For example, although the primary embodiment described herein discusses a website search application for products on a retail apparel site, the same approaches can assist other site types, including media sites, lead generation sites, and support sites. Additionally, it is contemplated that the broad scope of the invention described herein can also be applied to website navigation embodiments or other embodiments where web browsers are employed by end users. As such, this detailed description of various alternative embodiments should not be construed to limit the scope or breadth of the present invention.

For example, the primary embodiment described herein employs a web browser as the user interface and the web browser communicates with a local or remote server that is accessible via a network. In alternative embodiments, the user interface can be any sort of local or remote application with the ability to interact with a monitor device and display information on such a device and receive input from a user via such device or related peripherals. Additionally, the source of content information that is displayed on the monitor can be a local or remote server accessed via a network. The content source can also be local to a single machine and be accessible to an application may run on that machine, for example in a kiosk environment that may or may not have a network connection. Moreover, in some embodiments user input may be received via an input device such as a mouse but other user input mechanisms may also be employed, for example, keyboard, audio (e.g., voice), touch screen, or even eye movement can be used to receive user input. For example, a camera on the user browsing device may track user eye movement to determine the location on the screen where the user is looking. Additional alternative embodiments will also be understood by those skilled in the art.

Figures 1, 2:
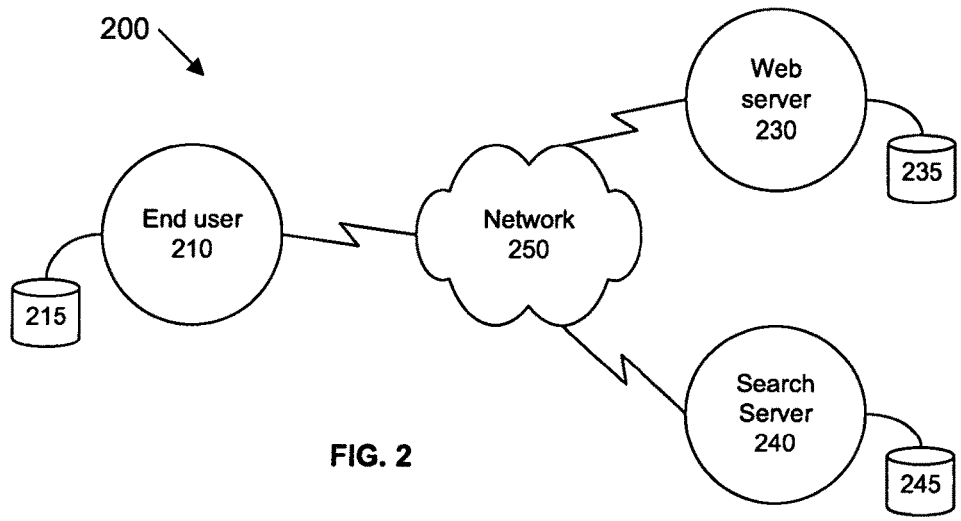
FIG. 1 is a web browser user interface illustrating an example conventional set of results from a website search.
FIG. 2 is a high level network diagram illustrating an example system for active browsing according to an embodiment of the present invention.

FIG. 2 is a high level network diagram illustrating an example system 200 for active browsing according to an embodiment of the present invention. In the illustrated embodiment, the system 200 comprises an end user device 210 communicatively coupled with a web server device 230 and a search server device 240 via a network 250. Each of the devices is configured with a data storage area, namely data storage areas 215, 235, and 245, respectively. In alternative embodiments, the web server 230 and search server 240 can be integrated on a single device.

The end user device 210 can be any sort of computing platform capable of running a web browser program (not shown). The web server device 230 can similarly be any sort of computing platform capable of serving content to one or more web browser programs. Similarly, the search server device 240 can also be any sort of computing platform capable of providing website search services on behalf of the web server 230. In alternative embodiments, the search server device 240 may provide any sort of desirable application or information on behalf of the web server device 230.

The network 250 can be any of a variety of network types and topologies and carry data traffic according to a variety of different protocols, including the hypertext transport protocol ("HTTP") and the related hypertext markup language ("HTML") content.

In one embodiment, the active browsing system 200 employs a combination of browser and server programming, for example Asynchronous Javascript and XML ("AJAX"), that allow for web pages to become applications that optimize server access and visitor interaction.

In one embodiment, the active browsing system 200 provides many advantages, including: (1) limiting and optimizing the amount of data that must be downloaded from a server during visitor interactions with the site search solution, as well as caching and prefetching this information to optimize the visitor experience; (2) providing user interface elements that help the visitor understand more information about the products, as well as provide navigation that enables easier choice of refinement options; and (3) providing user interface elements that preview and augment the refinement options so that visitors can be better informed about the benefit of using these refinement options.

The net effect of these three advantages is that the visitor site search experience is further optimized such that visitors do not need to expend as much effort to understand where their choices will lead them, and as a result, the visitors are more likely to make better choices along the way. Thus, visitors are more likely to find products and information of use to them, and are more likely to choose them, leading to improved results for the owner of the website and more conversions.

In one embodiment, the site search visitor experience is enabled by a client-side browser application and a server-side site search application. For example, this may be implemented using AJAX.

Search results are formatted using a guided search application employing custom templates, where they are fragmented into screen areas (e.g. bread crumbs, pagination controls, facets, search results) and overlay bubbles. The template also prints instructions for out-of-band commands, which can be used for opportunistic loading of further results, or result details.

The client application attaches itself to a web page within a web browser by identifying and distinguishing various linkage commands. In one embodiment, these linkage commands can be typed uniform resource locators ("URLs") or alternatively URLs with meta data identifying their purpose. For example: (i) URL within search; (ii) URL leaving search; (iii) URL for Active Browsing; and (iv) URL for cache warming.

In one embodiment, the (i) within search and (ii) leaving search URLs are the normal links within a web page and are distinguished by their base location. Additionally, the (i) URL within search can be any web link that shares a common base location with the application page, while any other web link can be a (ii) URL leaving search.

The (iii) URL for Active Browsing is a customization that can be added to any normal web link, so that a target might have both a (i) URL within search and a (ii) URL for Active Browsing, for example. These can be typically attached to targets within facets and search results, but may also be anywhere.

Finally, the (iv) URL for cache warming is a specific command to load the URL and put it in the cache when things are not too busy. This is an out-of-band communication that is neither apparent nor required, but if it succeeds then the user will not have to wait for those results when they are requested at a later time.

In one embodiment, when the application is attached to the web page, it intercepts mouse activity within the fragment areas, maintains a performance cache, and is responsible for drawing and updating the fragments on the page, which will be well understood by one having skill in the art and therefore is not described in this document.

When a user clicks (i) URL within search the application either draws the resulting page from the cache, or if that is unavailable it does an asynchronous request for new search data a search server or other source, receives the response, and adds the response to the cache.

When a user clicks (ii) URL leaving search the application pauses, takes steps to be persistent in browser memory, then hands the URL off for the browser to use as a normal link. Advantageously, the system 200 employs a persistence system to allow the user/browser to leave the search application to visit external pages and then come back and pick up at the previous location.

In another embodiment, when a user hovers a pointing device such as a mouse over a (iii) URL for Active Browsing for enough time, the application fetches, caches and draws the specified overlay fragment. This uses the same caching system, and the application attaches itself to the new overlay fragment using the same system described here, so it will intercept mouse activity and so forth. If an overlay itself has (iii) URL for Active Browsing elements, the system will draw those contents within the existing overlay without moving or repositioning the overlay.

There is no user interaction with (iv) URL for cache warming, but when these results are received, the application stores them in the cache and traverses the new fragments for image elements, e.g., <IMG> tags in HTML, and then sends a series of out-of-band requests to obtain those images. This last step is to refresh the browser's image cache, so that the associated page can be rendered more quickly and without network requests.

Advantageously, a hosted site search application network produces the results received from the URLs. Additionally, the results themselves may be influenced or directly driven by analytics data, which optimize the results through use of data such as conversion value, page view totals, and more. Further, cache warming may be influenced by analytics data indicating popularity of these user interface elements and commands. For example, web analytics applications can track the behavior of visitors to the website and their interaction using the system. Analysis of the historical data collected can show which actions are most likely to take place next at any given point during a browsing session, thus identifying for the system the particular actions and results that would be most beneficial to prefetch and cache. Thus, if most users are selecting one particular refinement option, it is more advantageous for the system to prefetch the results of that particular refinement option. This optimization ensures that the greatest number of subsequent actions are prefetched and cached and as a result minimizes latency during the browsing experience.

Figure 3:
FIG. 3 is a web browser user interface illustrating an example callout overlayed on a set of results from a website search according to an embodiment of the present invention.

FIG. 3 is a web browser user interface 300 illustrating an example callout 320 overlayed on a set of results from a website search according to an embodiment of the present invention. In the illustrated embodiment, the search results include a particular object 310 that represents one element of the search results. When the user hovers a pointing device over the object 310 for a predetermined period of time, the callout 320 is displayed.

The content within the callout 320 can be downloaded in real time as a direct result of the mouse hovering over the object 310 (e.g., a refinement option), or it can be preloaded in cache prior to the mouse hovering over the object 310. In one embodiment, the selection for what objects 310 have additional information preloaded can be determined through the use of analytics data.

In one embodiment, the callout 320 advantageously provides more information about the object than is provided on the search results page (e.g., by clicking on the object 310), but it does not require the effort of a click for the user to see this information. In the illustrated embodiment, the callout 320 contains information about the colors in which the shirt is available, as well as additional navigation options regarding similar products. For example, a visitor might click on a category 330 such as "Sportswear" to limit the results of the "men's t-shirts" search to only those shirts that are categorized as sportswear. The callout 320 provides a mechanism for the search result refinement options to be more easily chosen, and as such, makes it easier for the visitor to narrow down the available choices to a product that meets the user's needs.

Although not shown, the callout 320 may also include actions such as "add to cart" and "download" and other actions to facilitate those actions taking place directly from the callout without requiring the user to browse to a subsequent page. This enables immediate conversion while optimizing real estate on the results page by keeping the redundant links and buttons in conditional callouts. For example, in one embodiment the "add to cart" conversion action may not appear anywhere on a results page because it always appears in a callout 320 that appears when a user indicates an interest in a particular product.

Additionally, the various types of categories 330 that are shown in the callout can be associated with a refinement action. For example, when a site visitor is browsing through product search results the visitor may not know the particular category 330 that would return a set of results that is precisely what the visitor is seeking. Advantageously, by browsing through the results and seeing additional information displayed in a callout about those particular products of interest, the visitor can then decide to see a refined set of products limited to a specific category. Thus, the visitor can select a category 330 within the callout 320 in order to see only those results that match a specific attribute of the result set that the visitor is interested in. For example, a visitor may see a jacket that meets the visitor's criteria and discover through the callout 320 the attributes about that jacket such as that it is in the "winter jacket" category 330. The visitor may then select that category 330 (or any other attribute or category in the callout 320) to see more results that match the winter jacket category.

Figure 4:
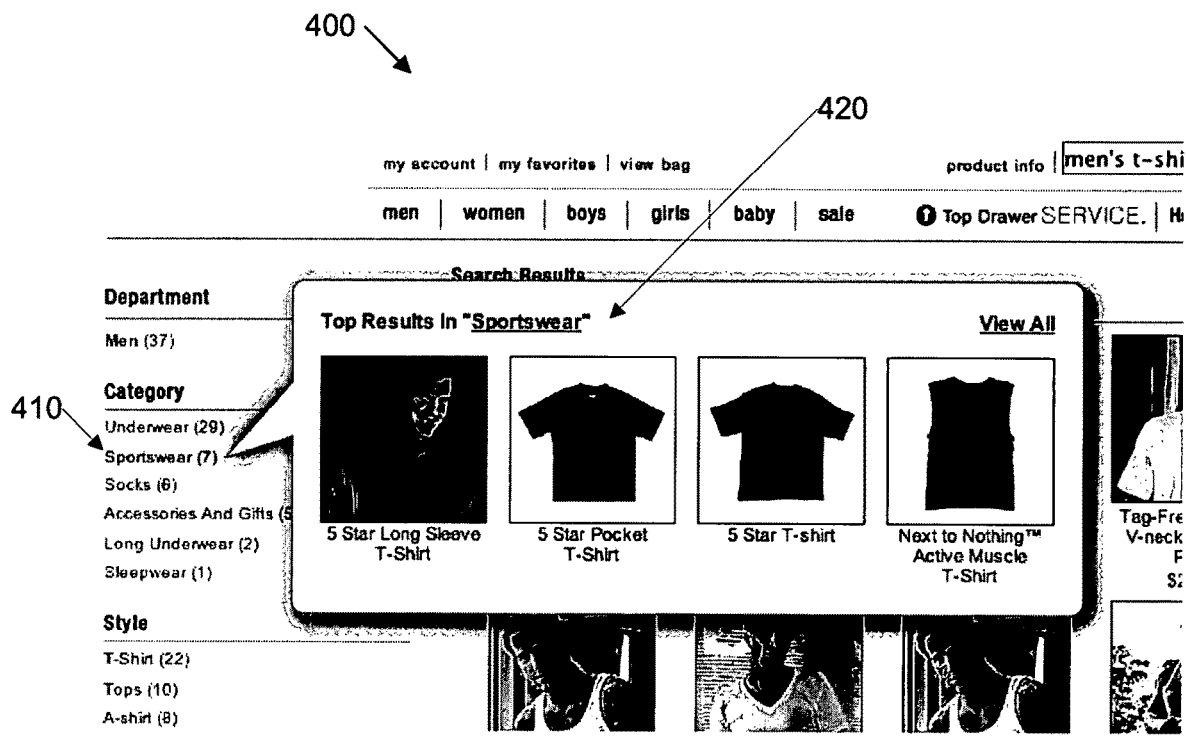
FIG. 4 is a web browser user interface illustrating an example callout overlayed on a refinement selection for a set of results from a website search according to an embodiment of the present invention.

FIG. 4 is a web browser user interface 400 illustrating an example callout 420 overlayed on a refinement selection for a set of results from a website search according to an embodiment of the present invention. In the illustrated embodiment, the search results include a list of refinement options under the heading "Category" that include a particular option 410. When the user hovers a pointing device over the option 410 for a predetermined period of time, the callout 420 is displayed.

Advantageously, the callout 420 gives a preview of the data underlying the action that would be performed if the object (such as object 410) were engaged. For example, if the "Sportswear" refinement was clicked by the user, a new page would be displayed that showed a corresponding list of products that meet the more narrow description. Because the callout 420 provides all or a portion of the corresponding list, it successfully draws visitors into using the refinement options, because they can accurately predict what will result from clicking the "Sportswear" refinement before expending the effort to click and view a new page.

Similarly, by clicking on a product within the callout 420, visitors can go directly to that product. Alternatively, hovering over an object in the callout 420 may produce a second cascading callout such that the user can see even further into the refined search results and then accomplish with a single click what would otherwise require at least two clicks.

The content within the callout 420 can be downloaded in real time, as a direct result of the mouse hovering over a refinement option, or it can be preloaded asynchronously prior to the mouse hovering over the refinement option.

FIG. 5 is a flow diagram illustrating an example method for providing a callout with preview data according to an embodiment of the present invention. The method shown in the illustrated embodiment may be implemented by a system such as that previously described with respect to FIG. 2. Initially, in step 450 the browser displays the search results that are received in response to the user sending a search request to the website. Next, in step 460 the application resident in the browser detects an event. For example, the event may be a mouse over event that may be dynamically or statically configured to be, for example, hovering the mouse over an object in the search results for a predetermined period of time, such as 2 or 3 seconds.

Once an event has been detected, the application obtains the results that would be responsive to actual engagement of the object. Thus, if a click on the object would result in providing a list of ten shirts, then in step 470 the application gets the list of ten shirts even though the object has not in fact been clicked. Advantageously, the responsive information may be dynamically obtained in real time by querying the search server or website and receiving the results. Alternatively, the responsive information may be obtained by fetching the information from cache, where it has been preloaded. In one embodiment, analytics data may be used to preload the most popular information to improve the user experience and improve responsiveness of the website.

After the responsive results have been obtained, the responsive information is provided to the user in a callout or other display vehicle, as shown in step 480. This process may continue with other objects on the search results page or with objects in a callout so that a series of cascading results can be shown to the user without requiring significant additional browsing interaction by the user and eliminating the resulting additional time.

FIG. 6 is a flow diagram illustrating another example method for providing a callout with preview data according to an embodiment of the present invention. The method shown in the illustrated embodiment may be implemented by a system such as that previously described with respect to FIG. 2. Note that the steps in FIG. 6 were previously described with respect to FIG. 5. Accordingly, the below description will emphasize the prefetching and chaching embodiment of FIG. 6.

After step 490, where the search results are displayed, in step 495 the next most likely browsing events are determined (e.g., by analysis of historical browsing data) and the text and graphical elements that are responsive to one or more of the next most likely browsing events is prefetched and temporarily stored in memory. Then, after an event is detected in step 500, the application resident in the browser obtains the responsive results in step 505. These results are obtained from a cache or other memory location, where the prefetched results were previously stored as a result of step 495. After the prefetched results are obtained, they are then displayed in a callout, as shown in step 510.

Advantageously, the prefetched results can be obtained significantly faster from a local cache in contrast to a server request across a network. This substantially improves the browsing experience by eliminating the visitor's wait time between making a selection and seeing the response. This substantial improvement is even more pronounced when graphic images are involved because obtaining image files over a network takes a relatively long period of time because image files are much larger in size than text files. Furthermore, obtaining image files in response to a request involves both the fetch time as well as the rendering time. A significant advantage of prefetching is that these tasks are performed in advance to provide the visitor with a much improved experience. Additionally, one significant benefit of caching is that it allows a visitor to return to a previously viewed callout, page, refinement, or other informational display without significant latency. This improved visitor experience reduces visitor effort and wait time and therefore improves the visitor experience and fosters more conversions.

FIG. 7 is a flow diagram illustrating an example method for refining the preview data results displayed in a callout according to an embodiment of the present invention. The method shown in the illustrated embodiment may be implemented by a system such as that previously described with respect to FIG. 2. Initially, in step 520, responsive information is provided to the user in a callout or other display vehicle. Next, in step 525 the application resident in the browser detects and receives a refinement selection. For example, the visitor may select a category or attribute that is presented in the callout. Next, the search results are updated in step 530 based on the refinement selection. In one embodiment, the original search results that are resident in local memory are filtered to refine the result set. In an alternative embodiment, or in combination, additional results may be obtained from a server or from local memory, for example if additional result data had been prefetched and stored in cache. Finally, in step 535 the refined results are displayed.

Figure 8:
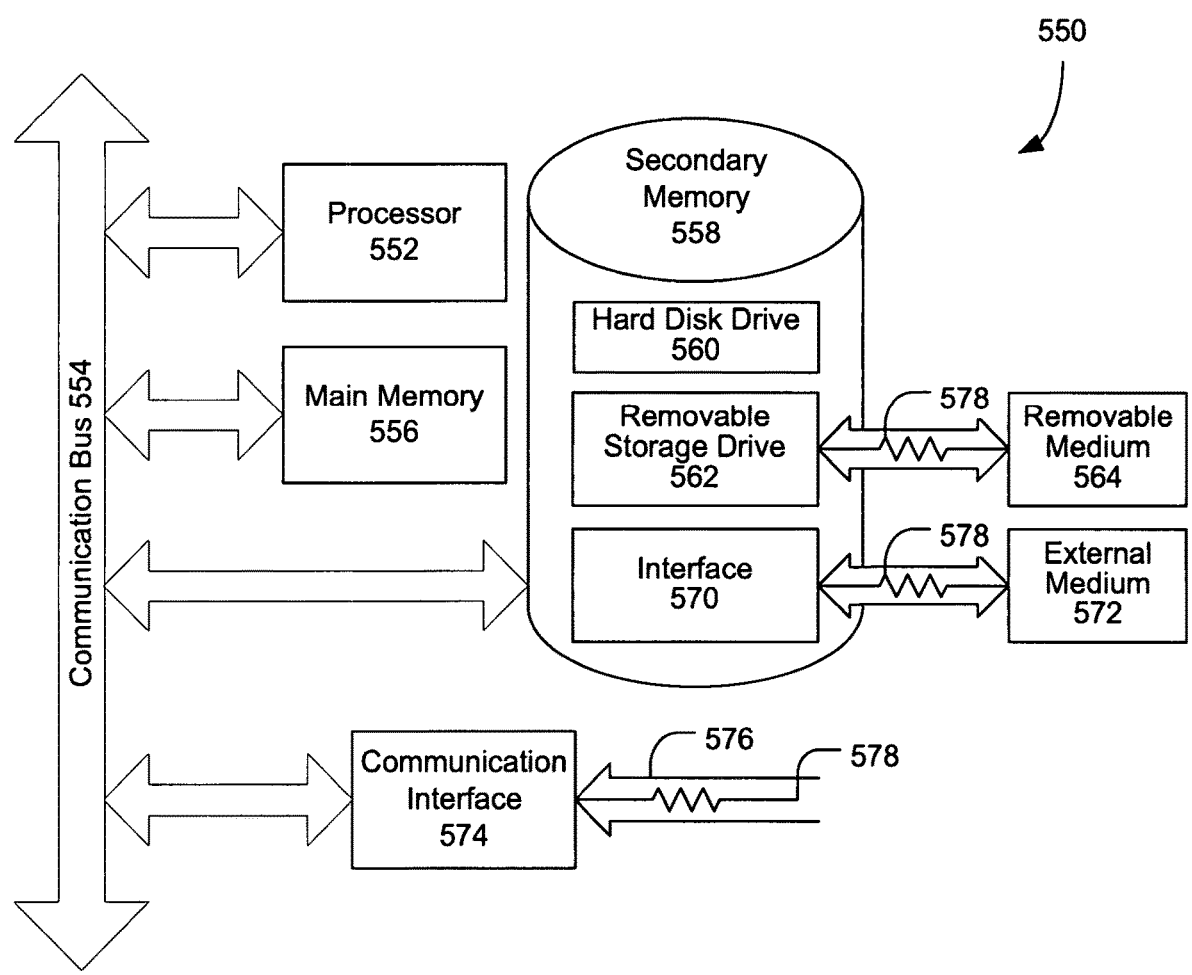
FIG. 8 is a block diagram illustrating an example computer system that may be used in connection with various embodiments described herein.

FIG. 8 is a block diagram illustrating an example computer system 550 that may be used in connection with various embodiments described herein. For example, the computer system 550 may be used in conjunction with an end user device, a web server device, or a search server device such as those previously described with respect to FIG. 2. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or an external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Persons skilled in the art can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The active browsing systems and methods described herein introduce new ways to allow site search solutions to present information and navigation on websites that benefit site owners through better visitor experiences and higher conversion rates. While the active browsing systems and methods have been described in the context of site search applications, the broad scope of the invention can be used for site-wide navigation and in other contexts. Lastly, integration with web analytics data can be used to optimize the user interface elements shown, such as what order to show them in, as well as which ones to cache.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A method comprising:
   providing for display in a browser a content page comprising a plurality of content items as results of a search request;
   detecting at the browser a selection of a selected content item of the plurality of content items, the selected content item corresponding to a search result;
   based on detecting at the browser the selection of the selected content item corresponding to the search result, providing a first search refinement window for display overlaid on the content page, the first search refinement window comprising information on the selected content item and a first search refinement option associated with the selected content item, and preloading to a cache of the browser additional information comprising a preview of additional content items associated with the first search refinement option;
   detecting at the first search refinement window a selection of the first search refinement option;
   based on detecting at the first search refinement window the selection of the first search refinement option, providing a second search refinement window for display overlaid on the content page and on the first search refinement window, the second search refinement window comprising the preloaded additional information and a second search refinement option associated with the selected content item; and
   based on detecting a selection of the second search refinement option, refining the plurality of content items provided for display in the content page based on the information on the selected content item and the preloaded additional information.

2. The method of claim 1 wherein the information on the selected content item comprises a category of the selected content item, and wherein refining the plurality of content items provides for display content items associated with the category.

3. The method of claim 1 wherein the first search refinement window and the second search refinement window are displayed while staying within context of the content page.

4. The method of claim 1 wherein the selection of the selected content item is detected by an event that detects an action, a movement, or a sound.

5. The method of claim 1 wherein the content page pertains to items for sale.

6. The method of claim 4 further comprising pre-fetching the information for the first search refinement window prior to occurrence of the event.

7. The method of claim 4 further comprising retrieving from the cache the information for the first search refinement window prior to occurrence of the event.

8. The method of claim 1 wherein the information on the selected content item comprises a subset of content from another content page.

9. The method of claim 1 wherein the information on the selected content item is determined based on analytics data.

10. A method comprising:
    providing for display in a browser a content page comprising a plurality of content items as results of a search request;
    detecting at the browser a selection of a selected content item of the plurality of content items, the selected content item corresponding to a search result;
    based on detecting at the browser the selection of the selected content item corresponding to the search result, providing a first search refinement window for display overlaid on the content page, the first search refinement window comprising (i) information comprising a refinement option associated with the selected content item and (ii) a direct action option associated with a function available on an additional content page associated with the selected content item; and responsive to detecting a selection of either the refinement option or the direct action option, performing a browsing optimization including one of:
  based on detecting the selection of the refinement option, providing a second search refinement window for display overlaid on the content page and on the first search refinement window, the second search refinement window comprising a preview of additional content associated with the refinement option, and
  based on detecting the selection of the direct action option, performing the function available on the additional content page without retrieving the additional content page.

11. The method of claim 10, wherein the direct action option is an add-to-cart action.

12. The method of claim 10, wherein the direct action option is a download action.

13. The method of claim 10 wherein the first search refinement window and the second search refinement window are displayed while staying within context of the content page.

14. The method of claim 10 wherein the selection of the selected content item is detected by an event that detects an action, a movement, or a sound.

15. The method of claim 10 wherein the content page pertains to items for sale.

16. The method of claim 14 further comprising pre-fetching the information for the first search refinement window prior to occurrence of the event.

17. The method of claim 14 further comprising retrieving from a cache the information for the first search refinement window prior to occurrence of the event.

18. The method of claim 10 wherein the information on the selected content item further comprises a subset of content from another content page.

19. The method of claim 10 wherein the information on the selected content item is determined based on analytics data.

20. A non-transitory computer-readable medium tangibly embodying program code, the program code comprising:
  program code for providing for display in a browser a content page comprising a plurality of content items as results of a search request;
  program code for detecting at the browser a selection of a selected content item of the plurality of content items, the selected content item corresponding to a search result;
  program code for, based on detecting at the browser the selection of the selected content item corresponding to the search result, providing a first search refinement window for display overlaid on the content page, the first search refinement window comprising information on the selected content item, a search refinement option associated with the selected content item, and a direct action option associated with the selected content item;
  program code for, in response to detecting a selection of the search refinement option, providing a second search refinement window for display overlaid on the content page and on the first search refinement window, the second search refinement window comprising a preview of additional content associated with the search refinement option and an additional search refinement option; and
  program code for, in response to detecting a selection of the additional search refinement option, refining the plurality of content items provided for display in the content page based on the information on the selected content item included in the first search refinement window and the additional content previewed in the second search refinement window.

21. The method of claim 1 wherein the search request retrieves the plurality of content items from a plurality of stored content items and wherein refining the plurality of content items comprises a second search request retrieving a second plurality of content items from the plurality of stored content items.

22. The method of claim 21 wherein the second plurality of content items comprises additional content items different than content items in the first plurality of content items.

23. The method of claim 10 wherein the information of the first search refinement window further comprises additional information on the selected content item.

24. The method of claim 10 wherein the direct action option displayed in the first search refinement window represents an action related to conversion of the selected content item, enabling immediate conversion of the selected content item without navigating to the additional content page specifically for the selected content item.

25. The method of claim 1 wherein the plurality of content items displayed in the content page comprise images of each of the plurality of content items, the images depicting representations of the selected plurality of content items satisfying the search request.

26. The method of claim 1 wherein the content page containing the plurality of content items is partially visible while the first search refinement window is being displayed, the content page displaying refinement of the plurality of content items based on the selection of the first search refinement option in the first search refinement window.

* * * * *